March 26, 1957 C. U. DEATON ET AL 2,786,431

SEPARABLE DOOR AND FRAME ENGAGING MECHANISM

Original Filed Aug. 3, 1954 14 Sheets-Sheet 1

INVENTORS
CHARLES U. DEATON and
CARL D. GRABER

BY Frease & Bishop
ATTORNEYS

SEPARABLE DOOR AND FRAME ENGAGING MECHANISM

Original Filed Aug. 3, 1954

INVENTORS
CHARLES U. DEATON and
CARL D. GRABER
BY Frease & Bishop
ATTORNEYS

SEPARABLE DOOR AND FRAME ENGAGING MECHANISM

Original Filed Aug. 3, 1954 14 Sheets-Sheet 3

INVENTORS
CHARLES U. DEATON and
CARL D. GRABER
BY Frease & Bishop
ATTORNEYS

SEPARABLE DOOR AND FRAME ENGAGING MECHANISM

Original Filed Aug. 3, 1954 14 Sheets-Sheet 4

INVENTORS
CHARLES U. DEATON and
CARL D. GRABER
BY
Frease & Bishop
ATTORNEYS

SEPARABLE DOOR AND FRAME ENGAGING MECHANISM

Original Filed Aug. 3, 1954 14 Sheets-Sheet 5

*INVENTORS*
CHARLES U. DEATON and
CARL D. GRABER
BY
Frease & Bishop
ATTORNEYS

INVENTORS
CHARLES U. DEATON and
CARL D. GRABER
BY Frease & Bishop
ATTORNEYS

March 26, 1957 C. U. DEATON ET AL 2,786,431

SEPARABLE DOOR AND FRAME ENGAGING MECHANISM

Original Filed Aug. 3, 1954 14 Sheets-Sheet 7

*INVENTORS*
CHARLES U. DEATON and
CARL D. GRABER

*BY* Frease & Bishop

ATTORNEYS

March 26, 1957 C. U. DEATON ET AL 2,786,431
SEPARABLE DOOR AND FRAME ENGAGING MECHANISM
Original Filed Aug. 3, 1954 14 Sheets-Sheet 8
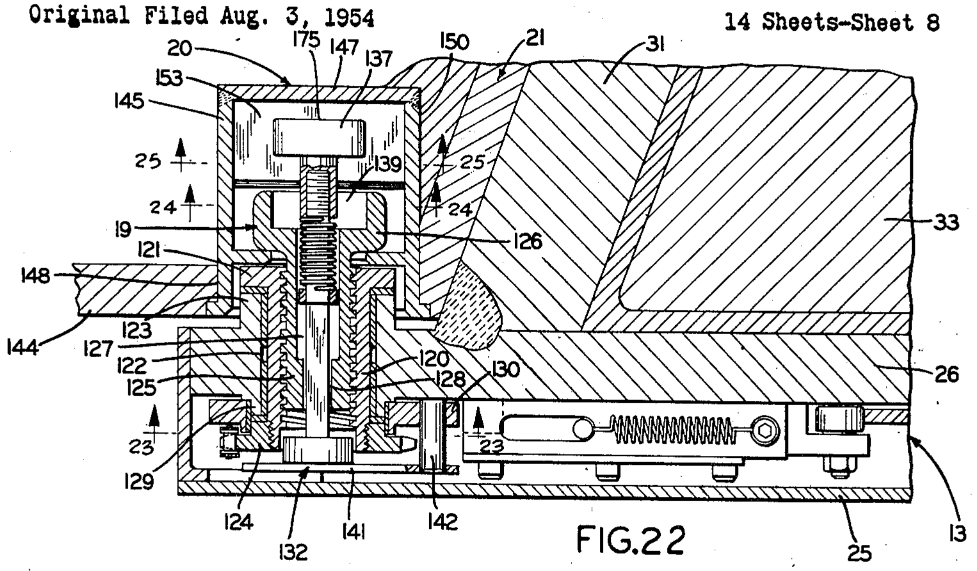
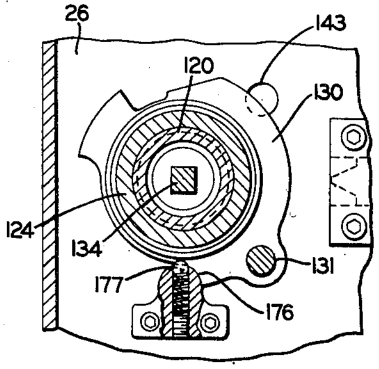
FIG.23
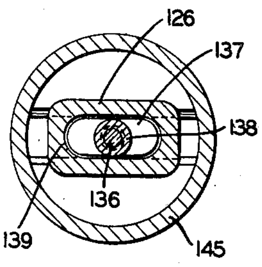
FIG.24
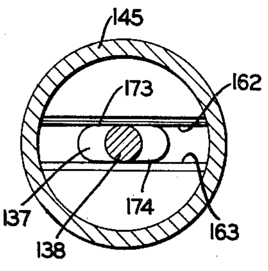
FIG.25
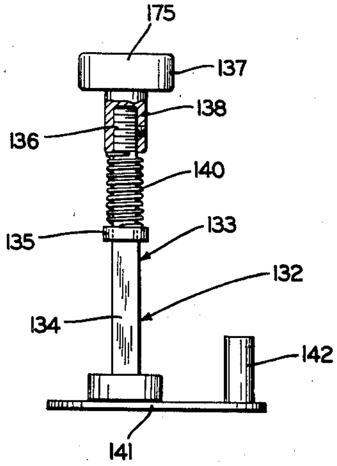
FIG.26
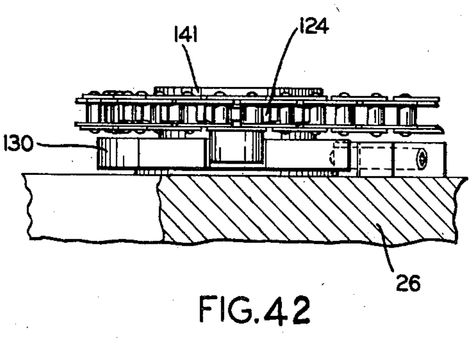
FIG.42
INVENTORS
CHARLES U. DEATON and
CARL D. GRABER
BY Frease & Bishop
ATTORNEYS March 26, 1957 C. U. DEATON ET AL 2,786,431

SEPARABLE DOOR AND FRAME ENGAGING MECHANISM

Original Filed Aug. 3, 1954 14 Sheets-Sheet 9

INVENTORS
CHARLES U. DEATON and
CARL D. GRABER

BY Frease & Bishop

ATTORNEYS

INVENTORS
CHARLES U. DEATON and
CARL D. GRABER

BY Frease & Bishop
ATTORNEYS

SEPARABLE DOOR AND FRAME ENGAGING MECHANISM

Original Filed Aug. 3, 1954

INVENTORS
CHARLES U. DEATON and
CARL D. GRABER
BY Frease & Bishop
ATTORNEYS

INVENTORS
CHARLES U. DEATON and
CARL D. GRABER
BY
Frease & Bishop
ATTORNEYS

March 26, 1957 C. U. DEATON ET AL 2,786,431

SEPARABLE DOOR AND FRAME ENGAGING MECHANISM

Original Filed Aug. 3, 1954 14 Sheets-Sheet 13

INVENTORS
CHARLES U. DEATON and
CARL D. GRABER

BY Frease & Bishop

ATTORNEYS

SEPARABLE DOOR AND FRAME ENGAGING MECHANISM

Original Filed Aug. 3, 1954

*INVENTORS*
CHARLES U. DEATON and
CARL D. GRABER
*BY* Frease & Bishop
ATTORNEYS

United States Patent Office 2,786,431

Patented Mar. 26, 1957

2,786,431

SEPARABLE DOOR AND FRAME ENGAGING MECHANISM

Charles U. Deaton, Kirkwood, Mo., and Carl D. Graber, Orrville, Ohio, assignors to Diebold, Incorporated, Canton, Ohio, a corporation of Ohio Original application August 3, 1954, Serial No. 447,544. Divided and this application March 31, 1955, Serial No. 498,372

7 Claims. (Cl. 109—62)

The invention or discovery relates to separable door and frame engaging mechanism for vault doors and the like, and the present invention or discovery is a division of the disclosure set forth in the application for United States Letters Patent of Charles U. Deaton and Carl D. Graber, for Vault Door Construction, filed August 3, 1954, Serial No. 447,544.

Prior to the present invention or discovery, usual vault door construction has included a massive crane assembly for hanging and swinging the door to and from closed position in the opening of the frame supporting the vault door, and a pressure system including a complicated array of operating bars on the front of the door, and which has the dual function of guiding the path of the door in swinging from the open to the closed position and of tightly pressing the door in the frame in the closed position.

The general objects of the present invention or discovery are to simplify the hanging means, and the pressure system of vault door construction.

The specific objects of the present invention or discovery include the provision of an improved separable door and frame engaging mechanism which has utility in itself, and which, in conjunction with an improved hinge construction, is operative on a vault door for moving the vault door horizontally between a sealing position in a frame opening and a position at which swinging of the vault door may take place.

A further specific object of the present invention or discovery is the provision of such an improved separable door and frame engaging mechanism which has a simplified construction and arrangement of its component parts, such parts being capable of economical manufacture and assembly, and the improved construction being capable of easy operation and easy and economical maintenance.

The foregoing and other objects are attained by the separable door and frame engaging mechanism, parts, combinations, and sub-combinations, which comprise the present invention or discovery, the nature of which is set forth in the following general statement, and preferred embodiments of which, together with their mode of use, are set forth by way of example in the following description, and which are particularly and distinctly pointed out and set forth in the appended claims forming part hereof.

The nature of the improved separable door and frame engaging mechanism of the present invention or discovery may be stated in general terms with reference to a vault door construction including members forming a rectangular door frame having a rectangular opening, a door movable into and out of plug fitting location in the opening, the door frame including opposite vertical side members, and a top hinge mechanism and a bottom hinge mechanism operatively interposed between one side of the door and one of the frame side members.

The top hinge mechanism includes roller means which supports the entire load of the door and means resisting tilting of the door, and the bottom hinge mechanism includes means resisting tilting of the door. Each hinge mechanism includes a housing connected with the door and a housing connected with the supporting frame side member, and each hinge mechanism includes a hinge pin located in the frame connected housing and extending into the door connected housing, and means are interposed between each hinge pin and its associated door connected housing for moving the door towards and away from the frame.

At the other side of the door there is operatively mounted one unit of the improved separable door and frame engaging mechanism including another unit located in the other frame side member. The door and frame engaging mechanism is operative for making an engagement between the door and the frame when the door is closed and for moving that portion of the door on which the one unit is mounted towards and way from the frame.

By way of example, embodiments of the improved vault door construction and parts thereof, of the present invention or discovery are illustrated in the accompanying drawings forming part hereof, in which Fig. 1 is a front elevational view of a preferred embodiment of the improved vault door construction, showing the outside or front faces of the door and frame, the door being in the closed position.

Fig. 22 is an enlarged fragmentary transverse sectional view, as on line 22—22, Fig. 21, showing details of the separable door and frame engaging mechanism, after its operation to plug-seal the door, and before the lock slide bolt of the door and frame engaging mechanism has been extended to the locking position shown in Fig. 21.

Fig. 23 is a fragmentary vertical sectional view thereof, as on line 23—23, Fig. 22, looking in the direction of the arrows.

Fig. 24 is another vertical sectional view thereof, as on line 24—24, Fig. 22, looking in the direction of the arrows.

Fig. 25 is another vertical sectional view thereof, as on line 25—25, Fig. 22, looking in the direction of the arrows.

Fig. 26 is a detached view of the trigger or control plunger assembly of the door and frame engaging mechanism.

Fig. 42 is an enlarged fragmentary elevational view, looking in the direction of the arrows 42—42, Fig. 36.

Similar numerals refer to similar parts throughout the several views of the drawings.

Figures 1, 2, 3:
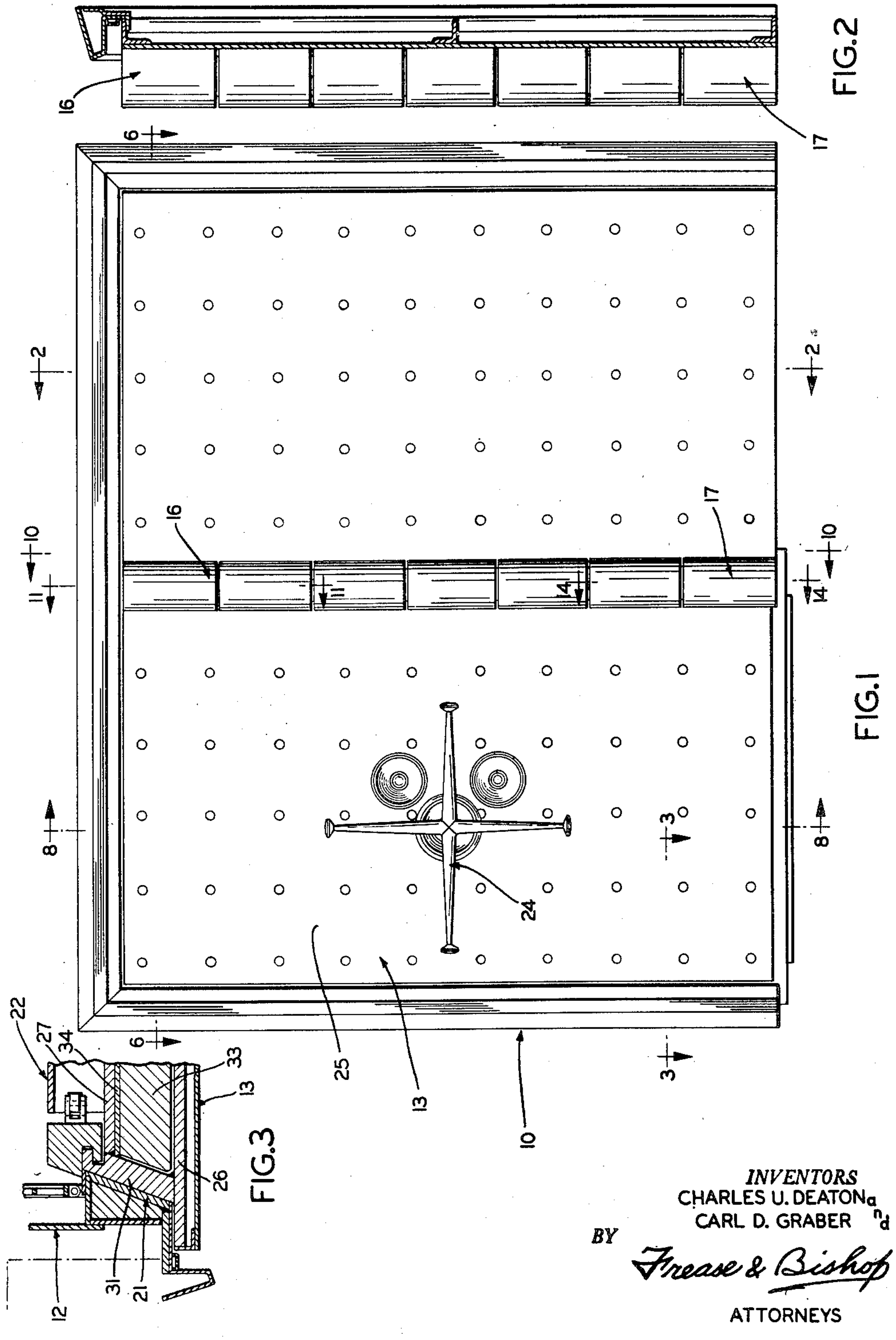
Fig. 2 is a vertical transverse sectional view thereof, as on line 2—2, Fig. 1, looking in the direction of the arrows.
Fig. 3 is a fragmentary horizontal sectional view thereof, as on line 3—3, Fig. 1, looking in the direction of the arrows.
Figure 5:
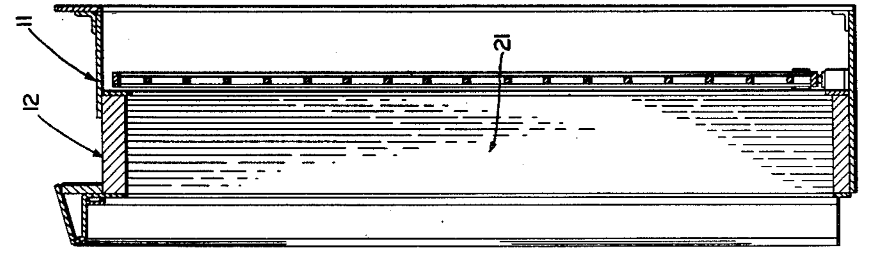
Fig. 5 is a vertical transverse sectional view thereof, as on line 5—5, Fig. 4, looking in the direction of the arrows.

The following descriptive specification is contained in consecutive sections, which are entitled as follows:

I. General Construction.
II. Hinge Mechanisms.
III. Separable Door and Frame Engaging Mechanism.

I. *General construction*

The improved vault door construction is indicated generally by 10, and includes members forming a rectangular door frame indicated generally by 11 which is located at the front end of a rectangular vestibule indicated generally by 12. An improved vault door indicated generally by 13 is supported at one side 14 on one of the composite side members 15 of the door frame by an improved top hinge mechanism indicated generally by 16, and by an improved bottom hinge mechanism indicated generally by 17.

At the other side 18 of the door 13 there is operatively mounted one unit indicated generally by 19 of a separable door and frame engaging mechanism. The other unit indicated generally by 20 of the separable door and frame engaging mechanism is located in the other composite frame side member 21.

The bolt work for the door is indicated generally by 22 and is operatively mounted on the rear of the door.

Common operating mechanism indicated generally by 23 is operatively associated with the hinge mechanisms 16 and 17, the unit 19 of the separable door and frame engaging mechanism, and the bolt work 22. The common operating mechanism 23 is actuatable by a rotatable spoke handle unit indicated generally by 24 projecting from the front face 25 of the door 13.

Referring particularly to Figs. 6, 7, 8, and 9, the door 13 is of composite construction and includes a rectangular case constituted by a front plate 26, a back plate 27, a top member 28, a bottom member 29, and side members 30 and 31. In the interior 32 of the door case formed by these plates and members, there is located in a usual manner a relatively thick torch resistant block 33 in the forward portion of the case interior 32, and a drill resistant plate 34 between the block 33 and the back plate 27.

The door case front plate 26 at the side 14 of the door is formed with alternating tongues 35 and notches 36, each tongue and each notch being rectangular and being sized to interfit with clearance in a registering notch or tongue formed in the frame side member 15.

Figure 10:
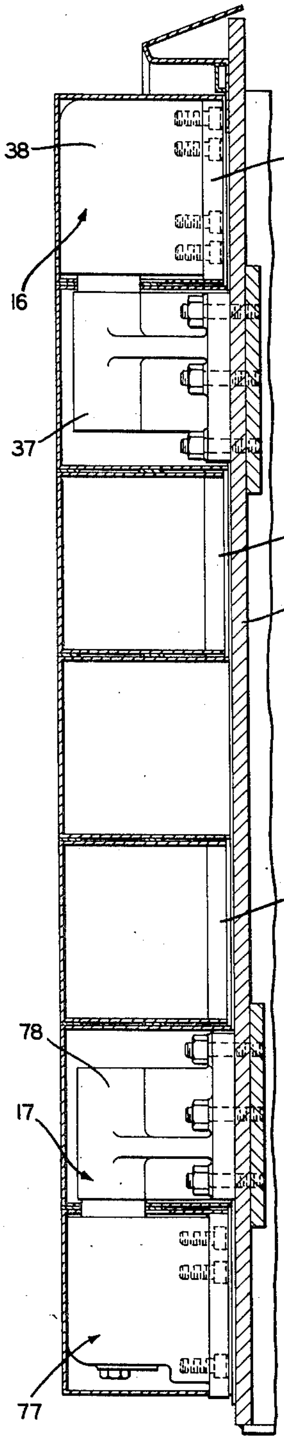
Fig. 10 is an enlarged vertical transverse sectional view as on line 10—10, Fig. 1, looking in the direction of the arrows, portions of the hinge covers and mock hinge covers being shown in section.
Figure 11:
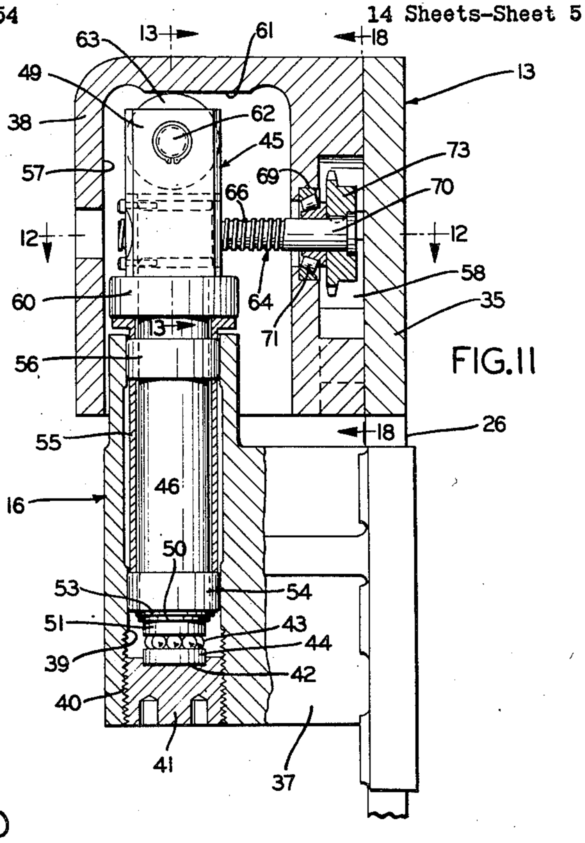
Fig. 11 is a fragmentary enlarged side elevational view of the top hinge mechanism corner of the construction, portions being shown in vertical section, as on line 11—11, Fig. 1, looking in the direction of the arrows.
Figures 12, 13:
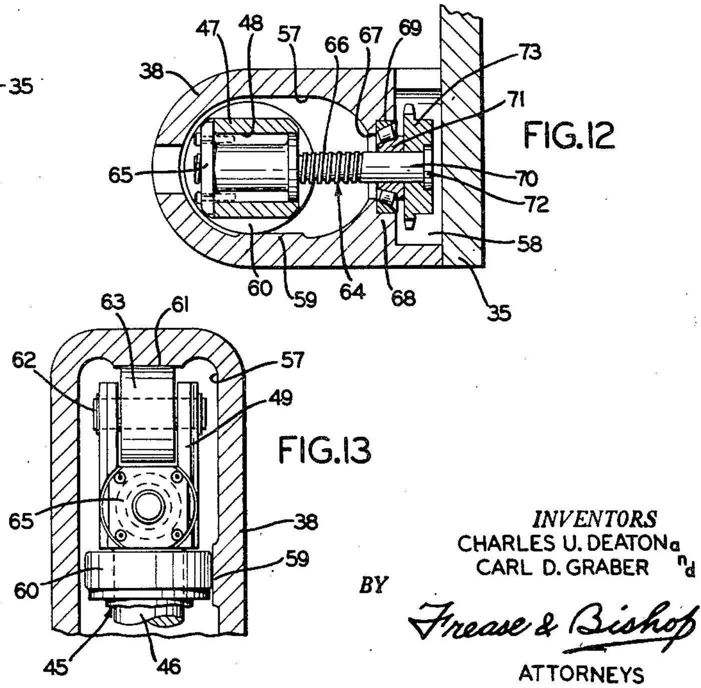
Fig. 12 is a horizontal sectional view of the top hinge mechanism of the construction, as on line 12—12, Fig. 11, looking in the direction of the arrows.
Fig. 13 is a fragmentary vertical transverse sectional view of the top hinge mechanism of the construction, as on line 13—13, Fig. 11, looking in the direction of the arrows.

The top tongue 35 of the door frame plate 26 mounts parts of the top hinge mechanism 16, as best shown in Figs. 10 and 11. Other parts of the top hinge mechanism 16 are supported on the immediately adjacent tongue of the door frame side member 15.

II. *Hinge mechanisms*

Referring to Figs. 11, 12, 13, 18, and 19, the top hinge mechanism 16 includes a lower housing and bearing block 37 mounted on the door frame side member 15, and an upper housing and bearing block 38 mounted on the top tongue 35 of the door front plate 26.

The lower housing and bearing block 37 has formed therein adjacent its front end a vertical bore 39 the lower end of which is provided with internal threads 40 in which is screwed an adjustable thrust bearing mounting plug 41, in the upper end of which there is formed a bearing seat socket 42. A ball thrust bearing 43 has its lower raceway 44 seated in the socket 42.

Figure 19:
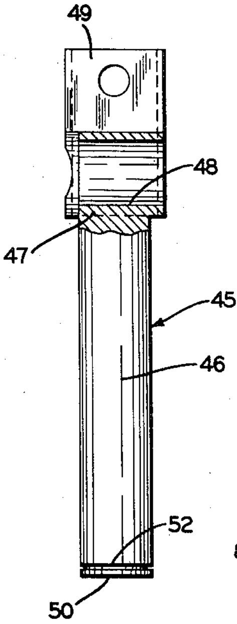
Fig. 19 is a detached view of the pin for the top hinge mechanism of the construction, portions being shown in vertical section.

The hinge pin 45 for the top hinge mechanism 16 is shown detached in Fig. 19, and includes a lower cylindrical shank 46, which makes junction at its upper end with an intermediate nut mounting portion 47 having a bore 48 formed therein, the axis of which intersects and is perpendicular to the longitudinal axis of the shank 46. Above the nut mounting portion 47 of the pin 45, there extends upwardly a pair of laterally spaced roll shaft supporting lugs 49. The shank 46 of the pin 45 has a lower transverse thrust face 50′.

In the assembled hinge mechanism 16, as best shown in Fig. 11, the shank 46 extends into the bore 39 of the block 37, and the thrust face 50 of the shank 46 seats upon the upper raceway 51 of the ball thrust bearing 43. Adjacent the thrust face 50 of the shank 46 there is formed in the cylindrical outer face of the shank 46 a retainer ring groove 52, which in the assembled hinge mechanism 16 seats a retainer ring 53. A lower radial needle bearing 54 fits on the shank 46 and seats on the retainer ring 53, the outer surface of the needle bearing 54 fitting in a central portion of the bore 39. A spacer sleeve 55 fits on the shank 46 and seats on the upper end of the needle bearing 54. An upper radial needle bearing 56 fits on the shank 46 and seats on the upper end of the sleeve 55, the outer surface of the needle bearing 56 fitting in an upper portion of the bore 39.

The upper housing and bearing block 38 has formed therein a downwardly opening socket 57, and the upper end of the shank 46 of the hinge pin 45, the nut mounting portion 47 thereof, and the lugs 49 are located in the socket 57. At the rear of the block 38 there is formed a rearwardly opening socket 58.

At one side of the inner surface of the socket 57 there is formed a flat bearing pad surface 59. On the shank 46 above the upper end of the lower housing and bearing block 37, there is mounted a radial ball or roller bearing 60 the cylindrical outer surface of the outer raceway of which rolls against the flat pad surface 59. The socket 57 has a downwardly facing horizontal flat bearing pad end surface 61. Between the lugs 49 at the upper end of the hinge pin 45 there is operatively mounted on an axially horizontal shaft 62 supported by the lugs 49, a load bearing roller 63 upon an upper horizontal surface portion of which the downwardly facing horizontal flat bearing pad end surface 61 is supported.

By the construction of the top hinge mechanism 16 as thus far described, the entire vertical load of the door 13 is carried from the upper housing and bearing block 38 to the roller 63 and through the pin 45 to the thrust bearing 43, and from the thrust bearing 43 to the lower housing and bearing block 37 and thence to the frame side member 15. The radial ball or roller bearing 60 rolling against the side flat pad surface 59 prevents tilting of the door 13.

Moreover, in the improved top hinge mechanism 16, the upper housing and bearing block 38 and the door 13 carried thereby are arranged to move in a straight line which is horizontal in the construction 10, and means are provided for moving the block 38 and upper end of the door 13 back and forth on the roller 63.

As shown the means for moving the block 38 back and forth on the roller 63, constitute a ball bearing nut and screw jack assembly indicated generally by 64, and which includes a ball bearing nut housing 65 which fits in and is secured in the bore 48 of the nut mounting portion 47 of the hinge pin 45. A screw 66 is screwed in the nut housing 65 and extends rearwardly towards the door top tongue 35 through an opening 67 formed in the wall 68 of the block 38 between the socket 58 and the socket 57. The opening 67 is formed with a bearing seat 69, and the screw 66 has a cylindrical shank 70 located in the opening 67, and a tapered roller thrust bearing 71 is fitted on the shank 70 and seated in the seat 69. The outer end of the shank 70 is formed with a thrust head 72, and a sprocket 73 is secured on the shank 70 between the head 72 and the inner raceway of the bearing 71. Rotation of the sprocket 73 and screw 66, by whatever means serves to advance or retract the block 38 and supported door 13 towards and away from the hinge pin 45.

The ball bearing nut and screw jack assembly 64, as above described may be otherwise termed a push-pull rectilinear thrust mechanism connected between the hinge 45 and the door 13.

The top hinge mechanism 16 thus constitutes in itself a novel hinge mechanism, which may be used when desired in other constructions than in the illustrated improved vault door 10.

Figure 18:
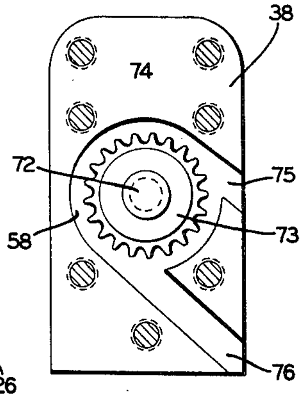
Fig. 18 is a vertical sectional view of the top hinge mechanism of the construction as on line 18—18, Fig. 11.

As shown in Fig. 18 the housing 38 has a back face 74 in which the socket 58 is located, and there is also formed in the back face 74 of the housing 38 sloping chain channel grooves 75 and 76 for purposes hereinafter set forth in greater detail.

The bottom hinge mechanism 17 is best shown in detail in Figs. 14, 15, 16, 17, and 20, and includes a lower housing and bearing block indicated generally by 77, and which is secured to the lowermost tongue 35 of the door front plate 26.

The bottom hinge mechanism 17 furthermore includes an upper housing and bearing block 78 which is secured to the tongue of the frame side member 15 next above the lowermost door tongue 35.

The upper housing and bearing block 78 has formed therein a vertical bore 79, the upper end of which is formed with internal threads 80, and a screw plug 81 is screwed in the upper end of the bore 79.

Figure 20:
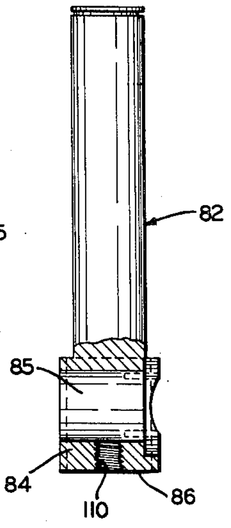
Fig. 20 is a detached view of the pin for the bottom hinge mechanism of the construction, portions being shown in section.
Figure 21:
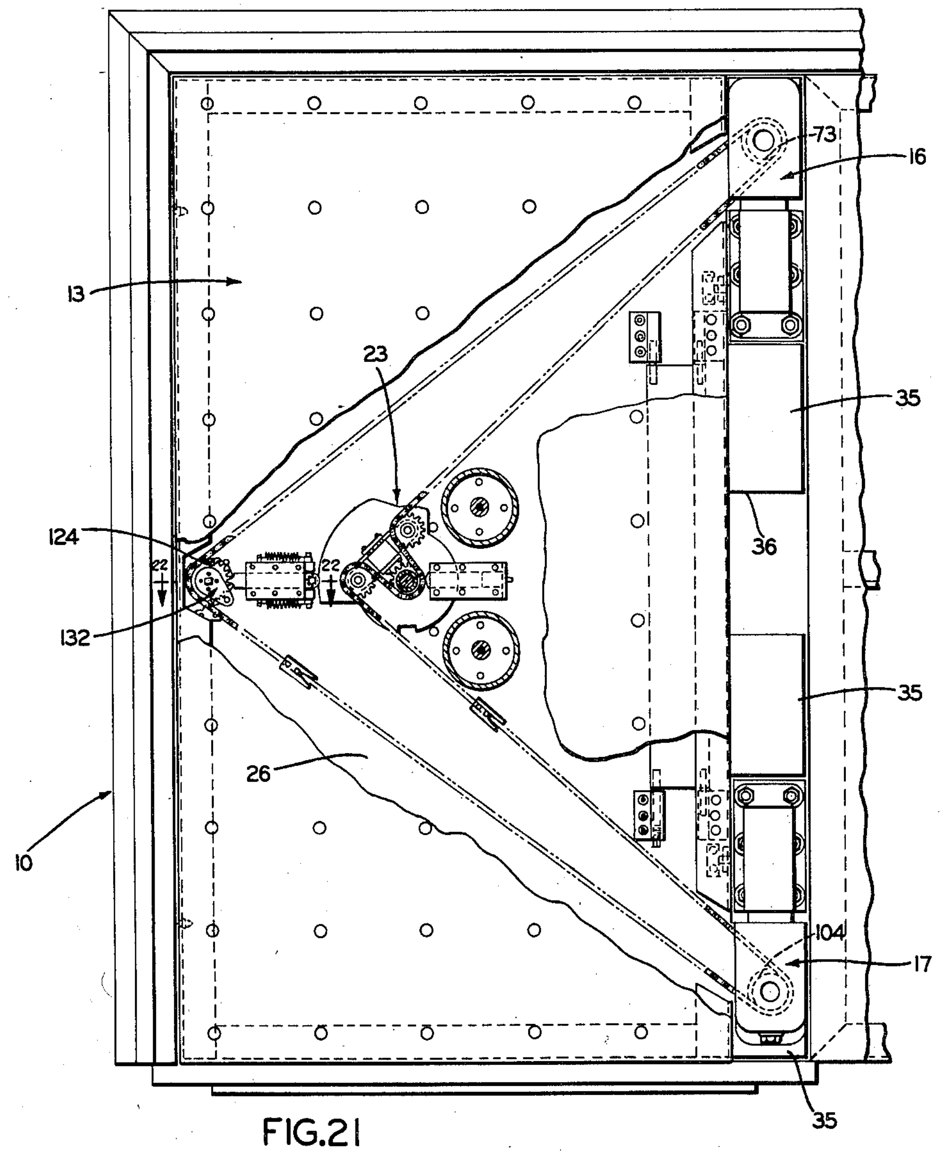
Fig. 21 is an enlarged fragmentary view of portions of the door and frame similar to Fig. 1, parts being removed, and portions being broken away, for illustrating details of construction.

The hinge pin 82 of the bottom hinge mechanism 17 is shown detached in Fig. 20, and includes an upper cylindrical shank 83 and a lower nut mounting head 84 having a transverse bore 85 formed therein, and the bottom face 86 of the head 84 is flat.

The lower housing and bearing block 77 has formed therein an upwardly opening socket 87 which has a lower flat bearing pad end surface 88 and a flat bearing pad side surface 89. The hinge pin 82 is located in the socket 87, the bottom face 86 of the hinge pin is slidably seated on the bearing pad end surface 88.

Immediately above the hinge pin head 84 there is seated on the shank 83, a radial ball bearing 90 having an outer raceway with an outer cylindrical surface which rolls against the bearing pad side surface 89. The shank 83 extends upwardly from the socket 87 in the lower block 77 into the bore 79 of the upper block 78. Immediately above the ball bearing 90, there is fitted on the shank 83, a needle bearing 91 the outer cylindrical surface of which is fitted in a lower portion of the bore 79. Above the needle bearing 91 a spacer sleeve 92 is fitted on the shank 83; and above the spacer sleeve 92, a needle bearing 93 is fitted on the upper end of the shank 83, and seated on the upper end of the sleeve 92. The outer cylindrical surface of the upper needle bearing 93 is fitted in an upper portion of the bore 79.

By the construction of the bottom hinge mechanism 17 as thus far described, tilting of the door 13 is prevented by the bearing pad side surface 89 thrusting against the radial ball bearing 90.

Moreover, in the improved bottom hinge mechanism 17, the lower housing and bearing block 77 and the lower corner of the door 13 to which the housing 77 is connected are arranged to move in a straight line which is horizontal in the construction 10, and means are provided for moving the block 77 and lower corner of the door 13 back and forth.

As shown, the means for moving the block 77 back and forth constitute a ball bearing nut and screw jack assembly indicated generally by 94, and which includes a ball bearing nut housing 95 which seats in and is secured in the bore 85 of the nut mounting head 84 of the hinge pin 82. A screw 96 is screwed in the nut housing 95 and extends rearwardly towards the door bottom tongue 35. The lower housing and bearing block 77 has formed therein a rearwardly opening socket 97, there being a wall 98 between the socket 97 and the socket 87, and the wall 98 has formed therein an opening 99 communicating between the socket 87 and the socket 97. The opening 99 is internally threaded, and an externally threaded thrust bearing seat ring 100 is screwed therein, and a roller thrust bearing 101 is seated in the ring 100.

The screw 96 has a cylindrical inner end shank 102 which is fitted in the inner raceway of the roller bearing 101, and there is a thrust flange 103 formed on the shank 102 adjacent the inner ends of the threads of the screw 96, the thrust flange 103 abutting against the outer end of the inner raceway of the roller bearing 101.

The shank 102 extends into the socket 97 where a sprocket 104 is located and secured on the shank 102.

Figure 17:
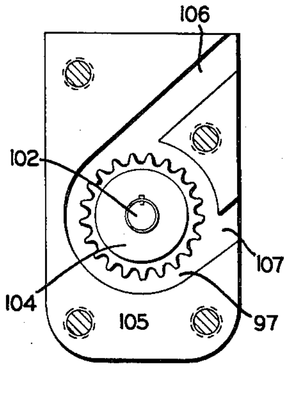
Fig. 17 is a fragmentary vertical sectional view of the bottom hinge mechanism of the construction as on line 17—17, Fig. 14.
Figure 15:
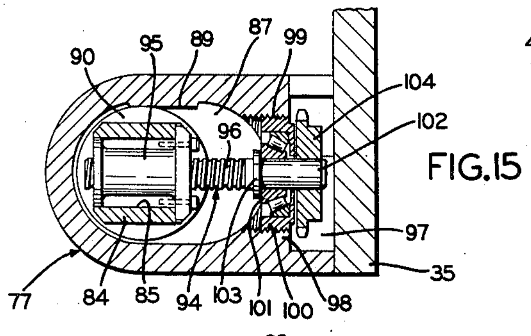
Fig. 15 is a horizontal sectional view of the bottom hinge mechanism of the construction, as on line 15—15, Fig. 14, looking in the direction of the arrows.
Figure 16:
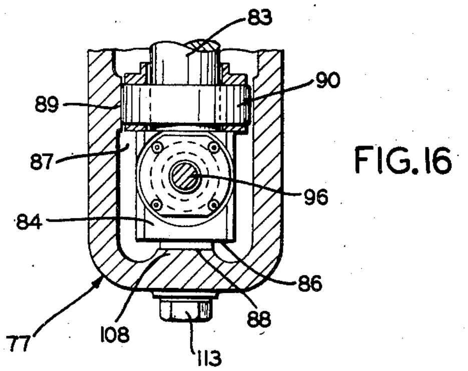
Fig. 16 is a fragmentary vertical transverse sectional view of the bottom hinge mechanism of the construction, as on line 16—16, Fig. 14, looking in the direction of the arrows.

The lower housing and bearing block 77 has a rear face 105 through which the socket 97 opens, as best shown in Fig. 17. There are also formed in the rear face 105 of the block 77, upper and lower chain channel grooves 106 and 107 for purposes hereinafter set forth in greater detail.

Figure 14:
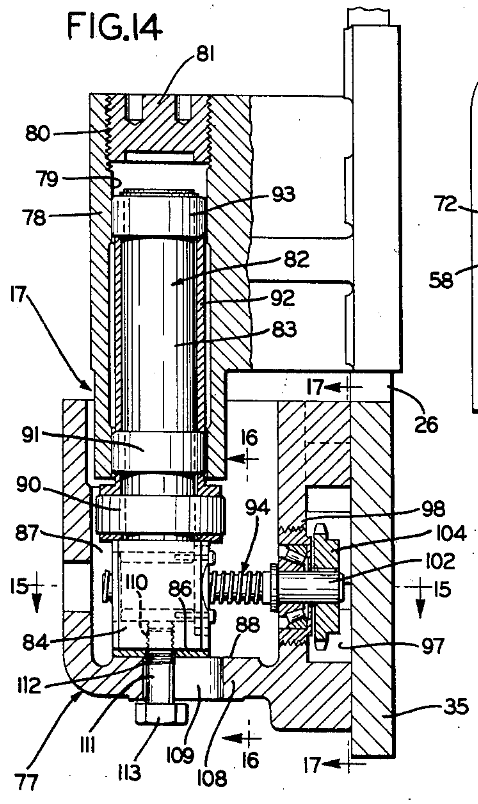
Fig. 14 is a fragmentary enlarged side elevational view of the bottom hinge mechanism corner of the construction, portions being shown in vertical section, as on line 14—14, Fig. 1, looking in the direction of the arrows.

Referring to Fig. 14, the bearing pad end surface 88 is an upper surface of the bottom end wall 108 of the housing and bearing block 77 of the bottom hinge mechanism 17. The end wall 108 has formed therein a central forwardly and rearwardly extending slot 109, and the nut mounting head 84 of the hinge pin 82 has formed therein a lower vertical internally threaded bore 110, and a washer is located between the bottom face 86 and the surface 88. A cap screw 111 has a threaded shank 112 extending through the slot 109 and the washer and screwed into the bore 110, and has a head 113 spaced a slight distance from the under face of the bottom end wall 108.

This construction of the slotted end wall 108, the cap screw 111, and the hinge pin 82, constitutes holddown means interposed between the hinge pin 82 and the housing and bearing block 78.

III. *Separable door and frame engaging mechanism*

Figure 4:
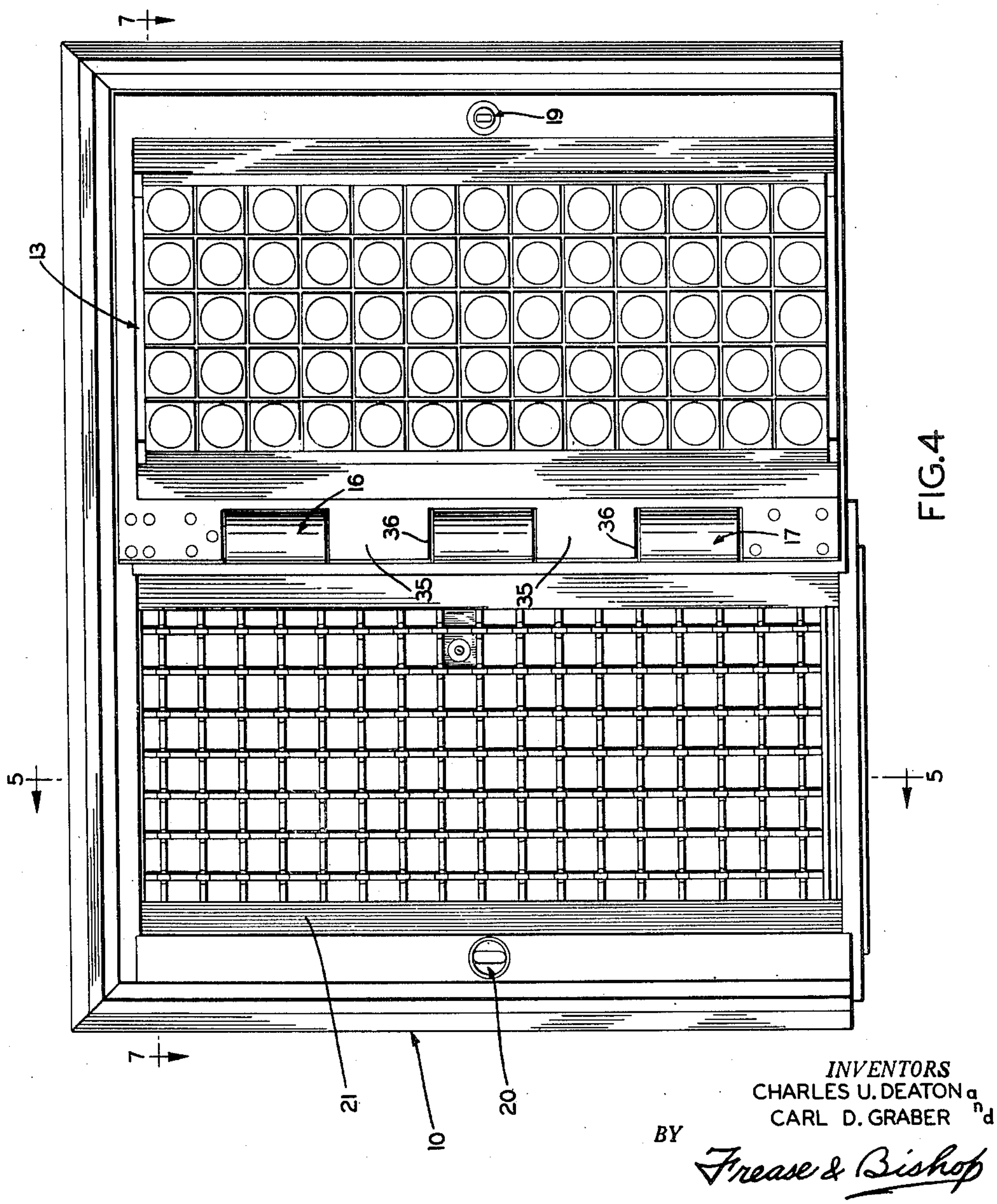
Fig. 4 is a view similar to Fig. 1, showing the door in the open position, and the day gate in the closed position.
Figure 6:
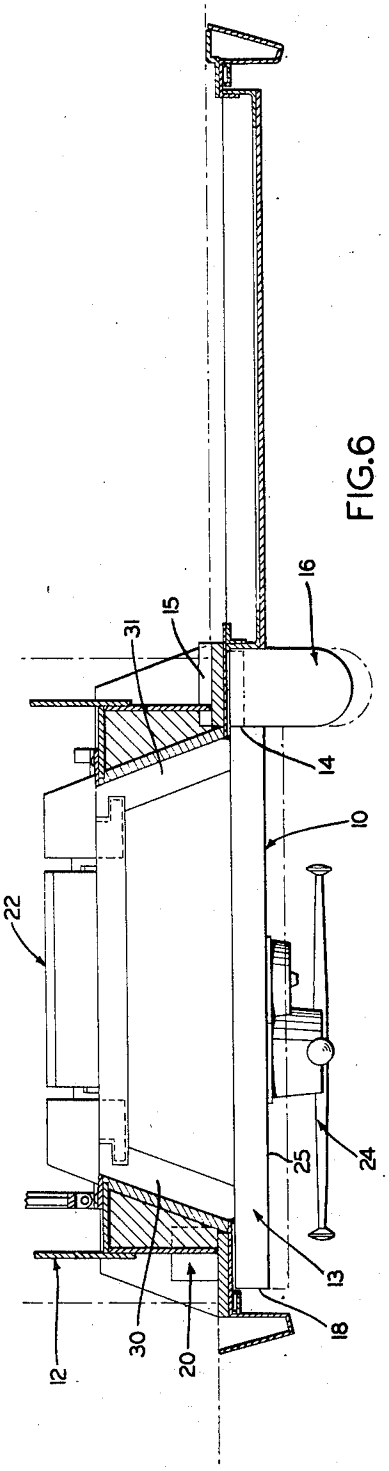
Fig. 6 is an enlarged horizontal sectional view of the door and frame, as on line 6—6, Fig. 1, looking in the direction of the arrows.
Figure 7:
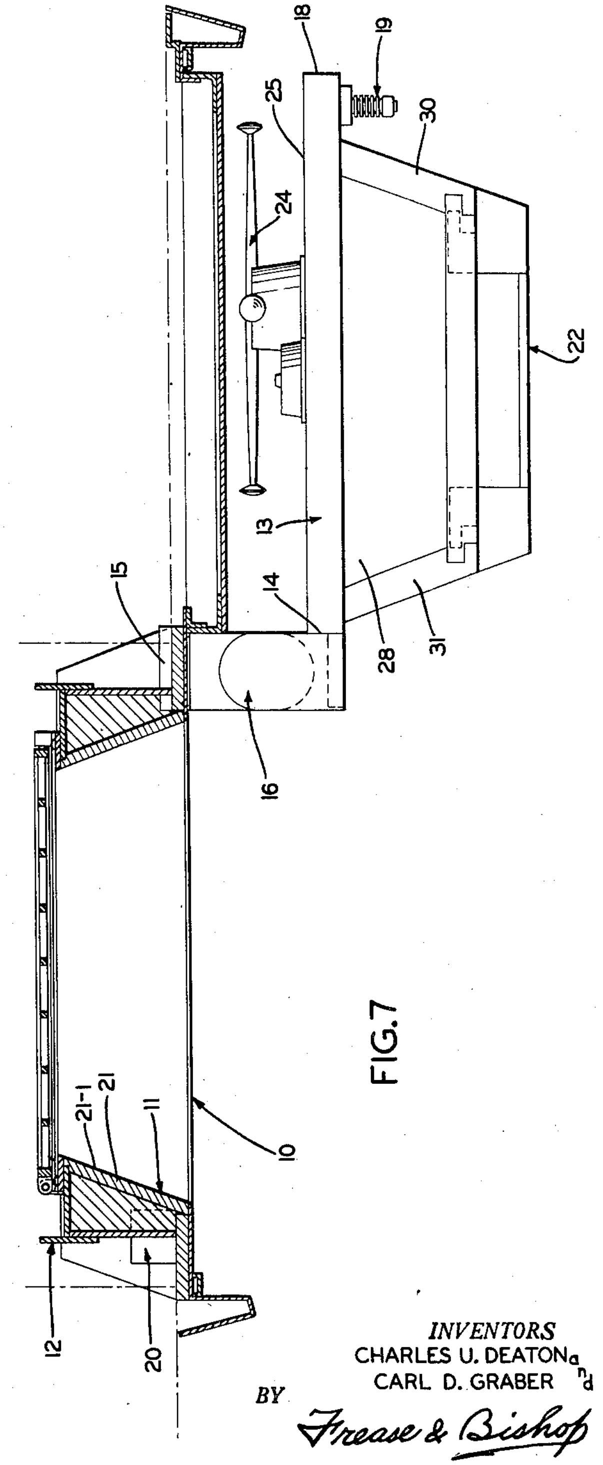
Fig. 7 is an enlarged horizontal sectional view of the door and frame, as on line 7—7, Fig. 4, looking in the direction of the arrows.
Figure 8:
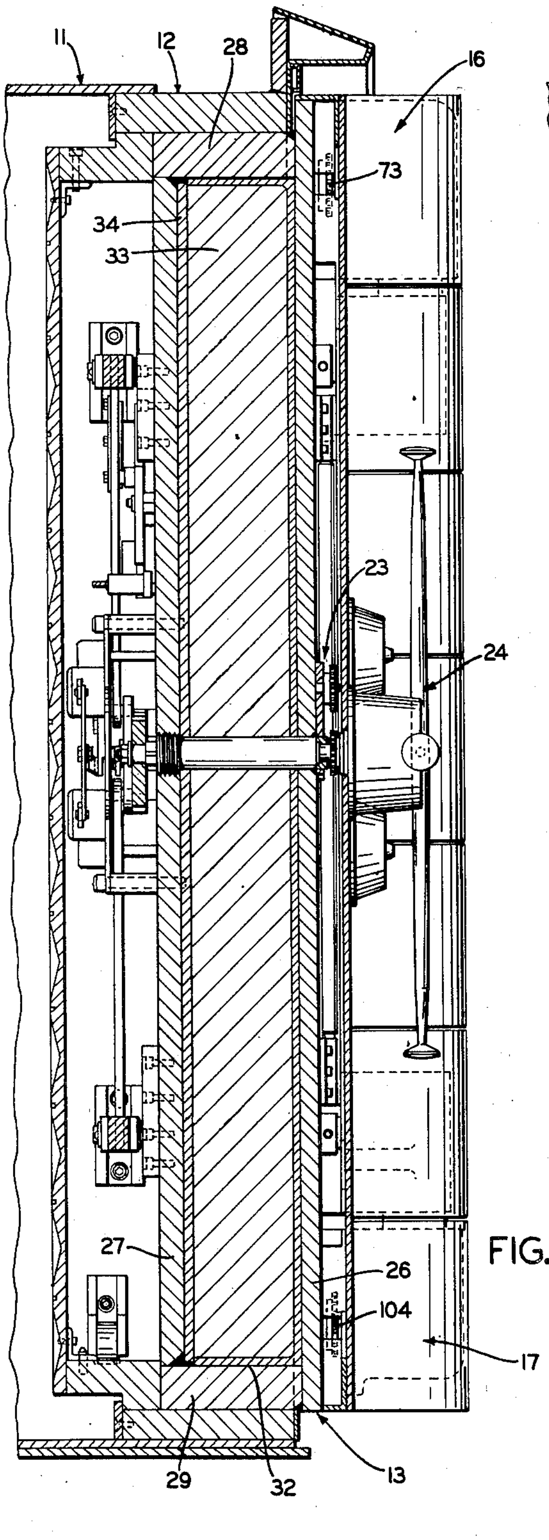
Fig. 8 is an enlarged vertical transverse sectional view of the door and frame, as on line 8—8, Fig. 1, looking in the direction of the arrows.
Figure 9:
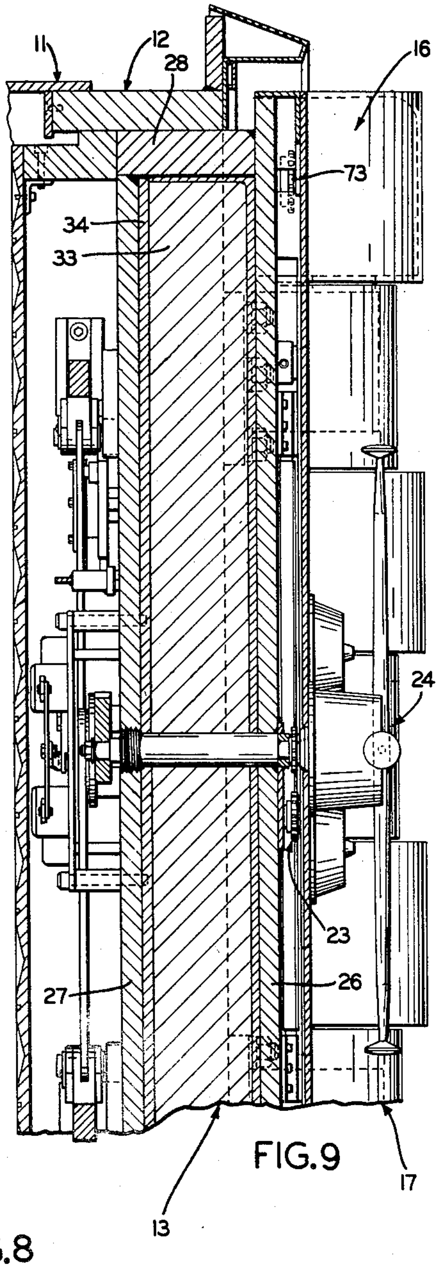
Fig. 9 is a view similar to Fig. 8, showing the door in its position after its operating mechanism has been actuated to perform initial steps in the door opening cycle, whereby the door has been moved horizontally from its plug-sealing position in the opening of the door frame, to a position displaced forwardly from the door frame.

As stated above, the improved separable door and frame engaging mechanism of the improved vault door construction includes a unit 19 on the door 13 and a unit 20 in the frame side member 21. These units 19 and 20 are shown in Fig. 4 in the complete construction.

The details of the separable door and frame engaging mechanism are shown in Figs. 22 to 31, inclusive.

The unit 19 on the door 13 includes a sleeve nut 120 which is exteriorly cylindrical and has an annular flange 121 at its inner end. The door front plate 26 extends laterally beyond the outer sloping side face of the door side member 31, which to a person facing the door 13 when it is closed, is at the left-hand side of the person, and for convenience the door side member 31 is termed the left-hand side member. The portion of the door front plate 26 extending laterally beyond the left-hand side member 31, may be termed the left-hand over-hang, and in which there is formed a bearing bore 122 in which the sleeve nut 120 is journalled.

On the rear face of the left-hand over-hang of the door front plate 26, there is located a boss 123 through which the bore 122 opens, and the flange 121 seats against the exterior end face of the boss 123. Preferably, there is interposed a bearing sleeve between the sleeve nut 120 and the bore 122, and preferably there is interposed an annular thrust disk between the flange 121 and the boss 123. The bore 122 opens at its front end through the front face of the door front plate 26, and the front end of the cylindrical sleeve nut 120 extends beyond the front face of the plate 26 and has secured thereon a sprocket 124.

The sleeve nut 120 is formed with internal threads, and an externally threaded tubular bolt 125 is screwed in the nut 120. A cupped T-head 126 is formed on the back end of the bolt 125 at the rear of the sleeve nut flange 121. The bore of the tubular bolt 125 includes a cylindrical portion 127 at its back end and a transversely square portion 128 at its front end.

The front face of the door front plate 26 has located thereon an externally cylindrical boss 129 through which the bore 122 opens concentrically. An operating and stop disk 130 is journalled on the boss 129, as best shown in Fig. 23. The disk 130 has formed therein a guide bore 131 at the right side of its axis, with reference to a person facing the door 13 when closed. The disk 130 is located between the front face of the door front plate 26 and the sprocket 124.

A trigger or control plunger assembly indicated generally by 132 and shown detached in Fig. 26, is operatively associated with the tubular bolt 125, the operating and stop disk 130, and the door front plate 26. The trigger or control plunger assembly 132 includes a shaft indicated generally by 133, and including a front square portion 134, having a back shoulder and an intermediate enlarged cylindrical washer 135 slidable on a back externally threaded cylindrical portion 136. In the assembled door 13 the shaft 133 is located in the bore of the tubular bolt 125, the shaft square portion 134 slidably fitting in the bore square portion 128, and the shaft washer 135 slidably fitting in the bore cylindrical portion 127.

The trigger or plunger assembly 132 furthermore includes a T-head 137 having an internally threaded tubular shank 138 which is screwed on the end of the threaded shaft portion 136.

The T-head 126 of the tubular bolt 125 has formed therein a rearwardly opening rectangular cup 139, and the T-head 137 of the assembly 132 slidably fits in the cup 139 of the T-head 126 in the assembled door 13.

A spring helix 140 engirdles the threaded portion 136 of the shaft 133 between the washer 135 and the outer end face of the shank 138, and the spring helix 140 reacts between the washer 135 and the T-head shank 138.

On the outer end of the square shaft portion 134, beyond the sprocket 124 in the assembled door 13, there is secured an actuating lever 141 from the rear face of which there extends a plunger 142 which fits in the guide bore 131 of the operating and stop disk 130.

Figure 27:
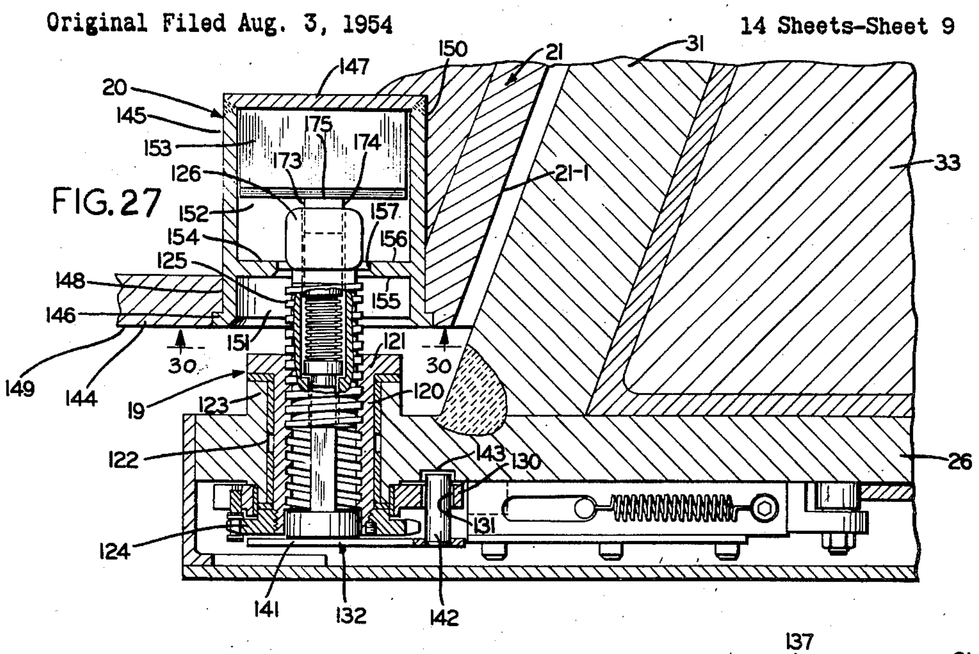
Fig. 27 is a fragmentary view similar to Fig. 22, showing the parts of the door and frame engaging mechanism in their relative positions when the door has been open and swung to the position ready for the plug-sealing operation, or when the door has been plug-sealed and is ready to be swung open.

Above and to the right of the axis of the shaft 133, with reference to a person facing the door 13 when closed, in the front face of the door front plate 26, there is formed a forwardly opening socket 143, in which the rear end of the plunger 142 may be slidably received, as best shown in Fig. 27.

In Fig. 27, the parts of the door and frame engaging mechanism are shown in their relative positions when the door has been open and has then been swung to the position for plug-sealing operation, or when the door has been moved outwardly from its plug-sealing position and is ready to be swung open. When the parts of the unit 19 are in the positions shown in Fig. 27, the plunger 142 is engaged in the socket 130 preventing any rotary movement of the parts in the unit 19.

The composite frame side member 21 at the left-hand side of the frame with reference to a person facing the door when the door is closed, includes a seal member 21–1 which slopes from front to rear laterally from the larger front end opening of the frame to the smaller rear end opening thereof. The front end of the frame side seal member 21–1 makes junction with a vertical front frame finish plate 144 which is overlapped by the left-hand over-hang of the door front plate 26 when the door is in the position shown in Fig. 27.

The unit 20 of the door and frame engaging mechanism is mounted in the frame finish plate 144 at a level for interaction with the unit 19.

Referring particularly to Figs. 4, 22, 24, 25, and 27 to 31 inclusive, the unit 20 of the door and frame engaging mechanism constitutes a compartmented housing including an externally cylindrical body 145 at the front end of which there is located an outwardly extending annular flange 146 and at the back end of which there is located a circular back wall 147. The front end of the cylindrical body 145 and the annular flange 146 seat in and are secured in a counter-bored opening 148 formed in the front frame finish plate 144 whose front face 149 is vertical and perpendicular to the horizontal axis of the cylindrical exterior surface 150 of the body 145.

The compartments of the body 145 include a forwardly opening front compartment 151, an intermediate compartment 152, and a back compartment 153. A front partition wall 154 has parallel front and back faces 155 and 156 parallel with the vertical front face 149 of the front frame finish plate 144, the front partition wall 154 being part of the body 145 of the unit 20 and separating the front compartment 151 and the intermediate compartment 152, each of which is interiorly cylindrical and concentric with the cylindrical exterior surface 150. The wall 154 has formed therein a slot 157 which is symmetrical with respect to the horizontal axis of the cylindrical surface 150.

Figures 28, 29, 30, 31:
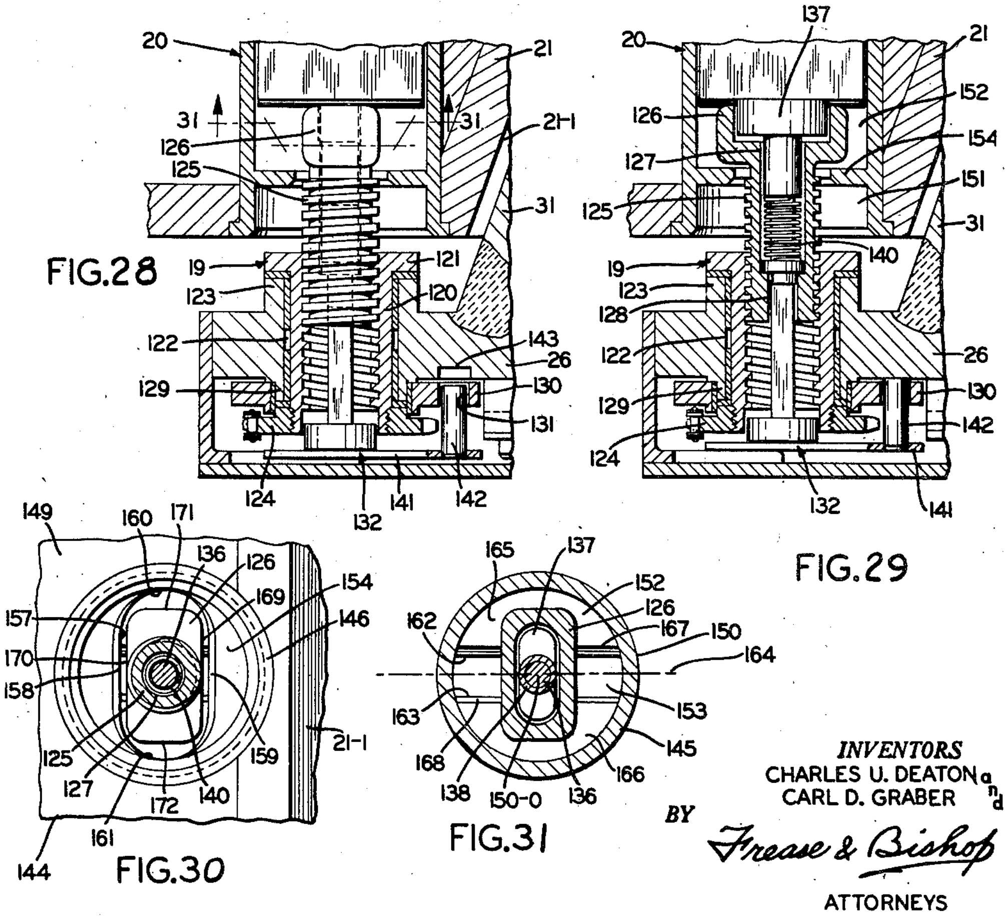
Fig. 28 is a fragmentary view similar to Fig. 27, showing the parts of the door and frame engaging mechanism after the door has been pushed to release the control plunger.
Fig. 29 is a fragmentary view similar to Fig. 28, showing the parts of the door and frame engaging mechanism after its operation to engage the door and the frame, and before its operation to plug-seal the door in the frame, as in Fig. 22.
Fig. 30 is a fragmentary transverse sectional view, as on line 30—30, Fig. 27, looking in the direction of the arrows.
Fig. 31 is a transverse sectional view, as on line 31—31, Fig. 28, looking in the direction of the arrows.

The slot 157 is vertically elongated, and has parallel vertical side faces 158 and 159 merging at opposite ends with semi-cylindrical top and bottom faces 160 and 161, as best shown in Fig. 30.

The back compartment 153 of the unit 20 is a socket opening forwardly into the intermediate compartment 152 and having parallel top and bottom horizontal faces 162 and 163 equally spaced on opposite sides of a horizontal plane 164 passing through the horizontal axis 150–0 of the cylindrical exterior surface 150 of the body 145, as best shown in Fig. 31.

At opposite sides of the plane 164, the intermediate compartment 152 has sectoral top and bottom faces 165 and 166 making junction with the socket faces 162 and 163, respectively, at bevelled or rounded corners 167 and 168.

The cupped T-head 126 of the bolt 125 is generally in the shape of elongated rectangular parallelopiped symmetrical with respect to the axis 150–0, and having rounded corners. The T-head 126 has parallel side faces 169 and 170 which are spaced from each other a distance less than the spacing of the side faces 158 and 159 of the slot 157; and the T-head 126 has parallel end faces 171 and 172 which are spaced from each other a distance less than the distances from each other of the nearest portions of the top and bottom faces 160 and 161 of the slot 157. In other words, when the T-head 126 is positioned as in Figs. 27, 28, 30, and 31, there is substantial clearance between the T-head 126 and slot 157.

As above stated, the T-head 137 slidably fits in the cup 139 of the T-head 126, and the T-head 137 has side faces 173 and 174 which are spaced from each other a distance slightly less than is the distance between the socket faces 162 and 163.

The unit 19 of the door and frame engaging mechanism may be more definitively termed an anchor and push unit, and the unit 20 of the door and frame engaging mechanism may be more definitively termed a detent and thrust reacting unit. In a similar and more definitive manner, the cupped T-head 126 may be termed an anchor and push T-head; the partition wall 154 may be termed a slotted detent wall; the sectoral top and bottom faces 165 and 166 may be termed thrust reacting faces; the socket compartment 153 may be termed an anti-twist socket; and the T-head 137 may be termed an anti-twist T-head.

The anchor and push unit 19 may also be termed a separable push-pull rectilinear thrust mechanism or unit.

In the complete vault door construction 10, the separable door and frame engaging mechanism is operated in co-ordination with the hinge mechanisms 16 and 17, and other parts, as is hereinafter described in detail.

However, the door and frame engaging mechanism, as thus far described is capable of independent use, and manual operation, as follows:

Referring to Figs. 27 and 30, the door 13 has been moved to a position in which the T-head 126 with its side faces 169 and 170 in the vertical position and in registering relationship with the vertical side faces 158 and 159 of the slot 157, has been pushed through the slot 157 until the back face 175 of the T-head 137 just touches the sectoral faces 165 and 166. The trigger or control plunger assembly 132 has its plunger 142 seated in the socket 143 of the door front plate 126, thus preventing any turning of the assembly 132 and the bolt 125, and preventing any further backward movement of the shaft 133 and the spring pressed T-head 137 thereon.

When, however, the door 13 is pushed a slight distance further towards the frame 11, to the position shown in Fig. 28, the assembly 132 remains horizontally stationary, and the door front plate 26 moves horizontally to a position in which the socket 143 is disengaged from the plunger 142. The assembly 132 and parts rotatable therewith are then free to rotate, the actuating lever 141 being in the upper position shown in Fig. 36.

Figures 39, 45:
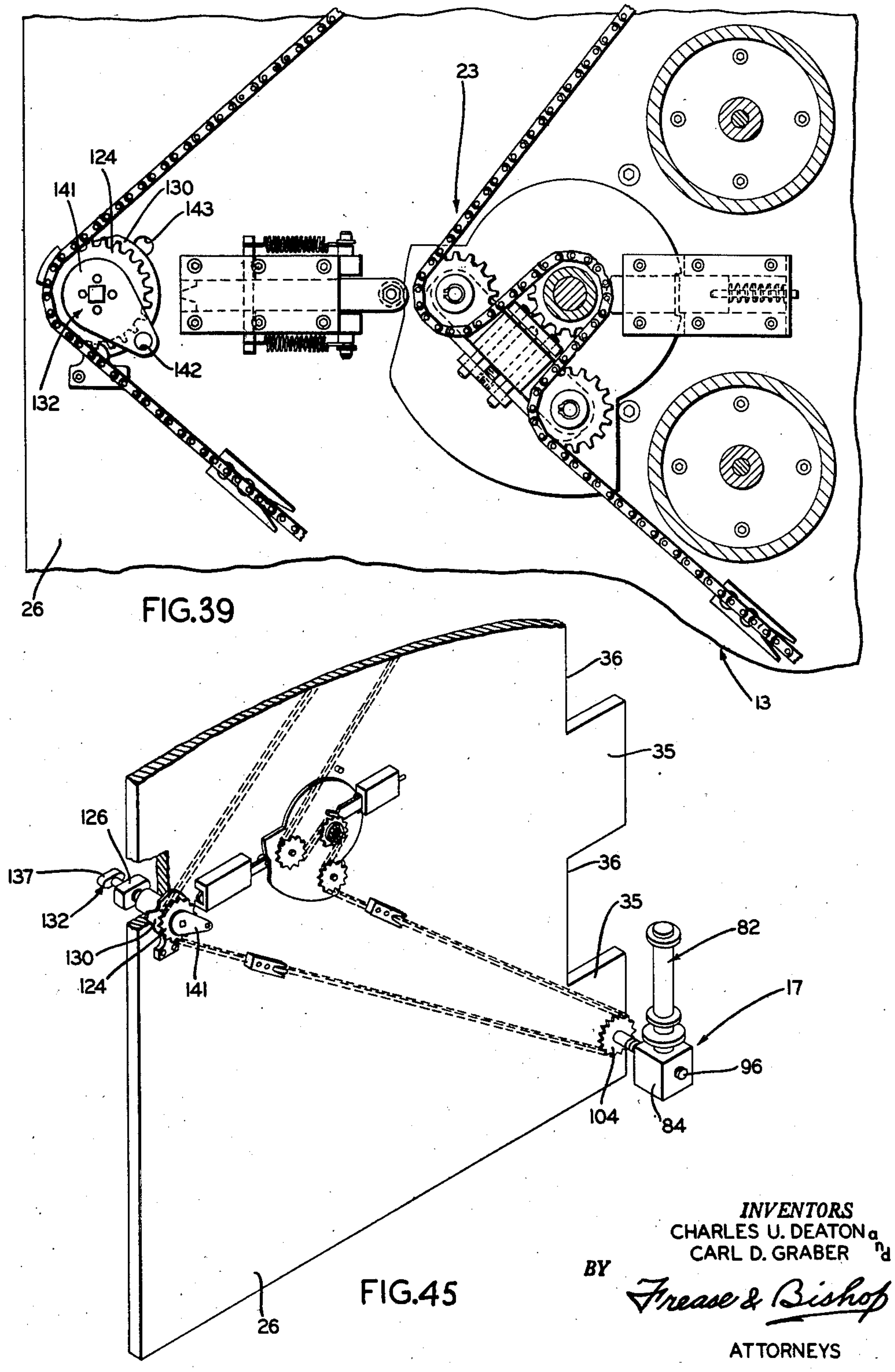
Fig. 39 is a view similar to Figs. 32 and 36, showing the parts in their relative positions at an intermediate point between the positions shown in Fig. 32 and Fig. 36.
Fig. 45 is a fragmentary view similar to Figs. 43 and 44, showing the relative positions of the illustrated parts, at an intermediate point between the positions shown in Fig. 43 and the positions shown in Fig. 44.

If a twisting or turning force or torque is then applied to the operating and stop disk 130, the lever 141 and parts movable therewith will turn through an arc of 90° to the position of the disk 130 shown in Fig. 23. The disk 130 has formed in its outer periphery a curved outwardly opening stop recess 176, and a spring loaded ball 177 is mounted on the door front plate 26 and projects from the front face thereof at a position so as to be received by the stop recess 176 of the disk 130 at the relative positions of the parts shown in Fig. 23, and which positions other parts as shown in Figs. 29 and 39.

The sprocket 124 is then rotated so as to turn the nut 120 and screw the bolt 125 in the nut 120, the anchor and push T-head 126 pulling against the back face 156 of the slotted detent wall 154, and the anti-twist T-head 137 advancing into the anti-twist socket 153, until the parts have attained the relative positions shown in Fig. 22, in which the door 13 is plug-sealed in the opening of the door frame 11.

Figure 32:
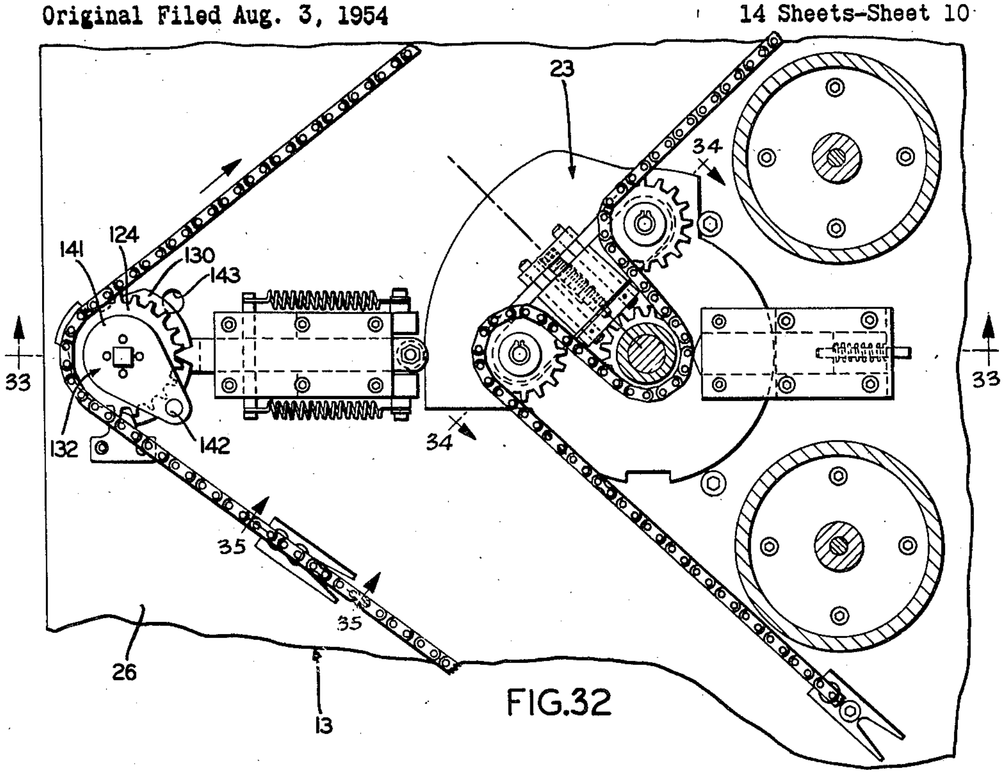
Fig. 32 is an enlarged view of portions of Fig. 21, illustrating details of construction of the common operating mechanism, parts being shown in their relative positions when the door is closed, the bolts are thrown in engagement with the door frame side members, and the locking parts are in locked position.
Figure 33:
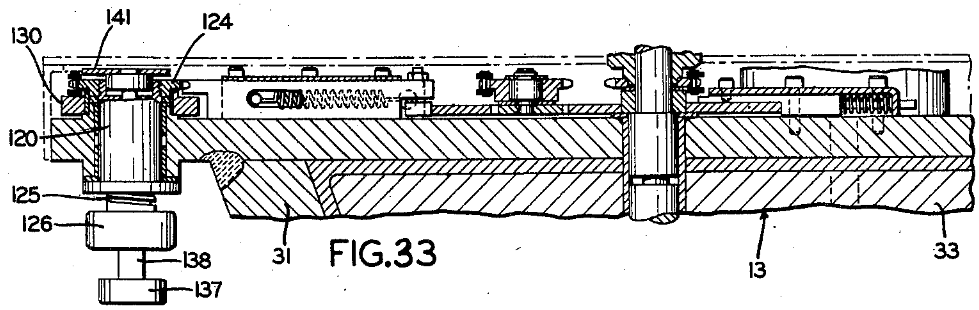
Fig. 33 is a transverse sectional view thereof, as on line 33—33, Fig. 32, looking in the direction of the arrows.
Figure 34:
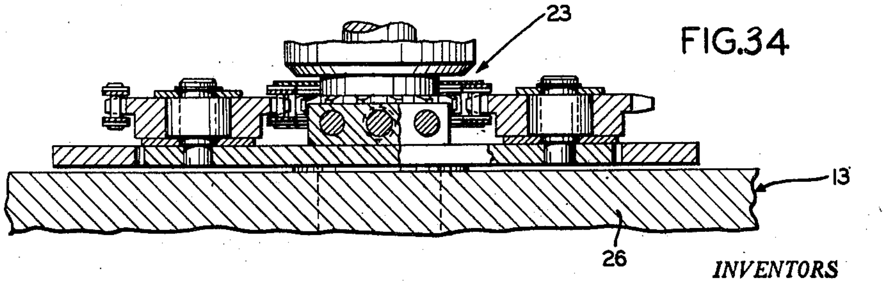
Fig. 34 is another fragmentary transverse sectional view thereof, as on line 34—34, Fig. 32, looking in the direction of the arrows.
Figure 35:
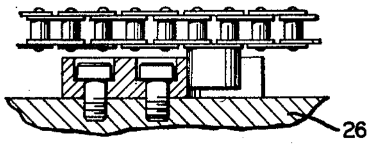
Fig. 35 is another fragmentary transverse sectional view thereof, as on line 35—35, Fig. 32, looking in the direction of the arrows.
Figures 36, 37, 40:
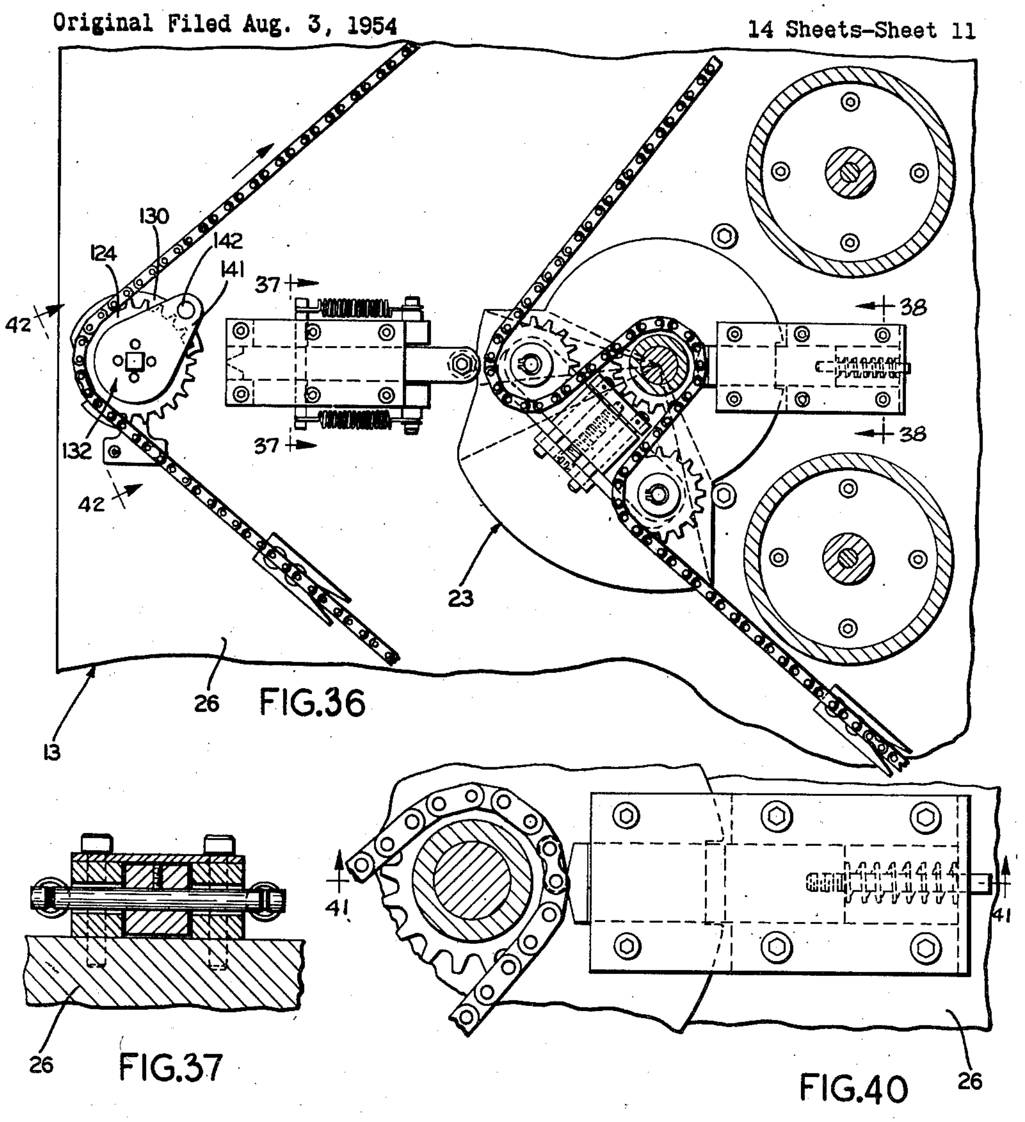
Fig. 36 is a view similar to Fig. 32, showing the parts in their relative positions, when the lock parts have been withdrawn from locking engagement, the bolt bars withdrawn, and other parts positioned for permitting opening of the door if closed, or positioning of the door if open for operation of the door and frame engaging mechanism.
Fig. 37 is a fragmentary vertical sectional view thereof, as on line 37—37, Fig. 36, looking in the direction of the arrows.
Fig. 40 is an enlarged view of portions of Fig. 39.
Figure 38:
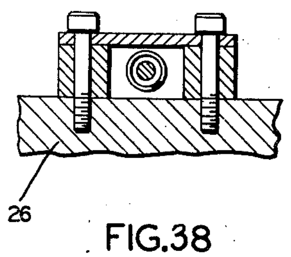
Fig. 38 is another fragmentary transverse sectional view thereof, as on line 38—38, Fig. 36, looking in the direction of the arrows.
Figure 41:
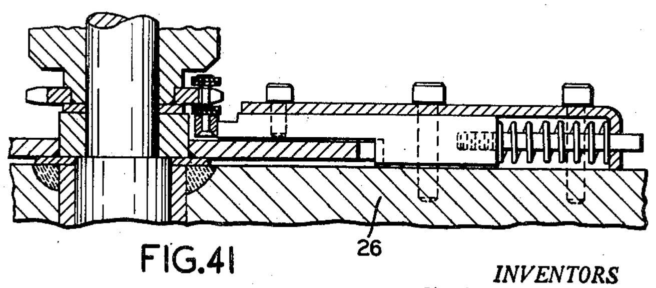
Fig. 41 is a horizontal transverse sectional view thereof, as on line 41—41, Fig. 40, looking in the direction of the arrows.

Reversing the above described cycle of operations of the door and frame engaging mechanism serves to return the parts from the engaged positions shown in Figs. 22 and 32 to the disengaged positions shown in Figs. 27 and 36.

Figure 43:
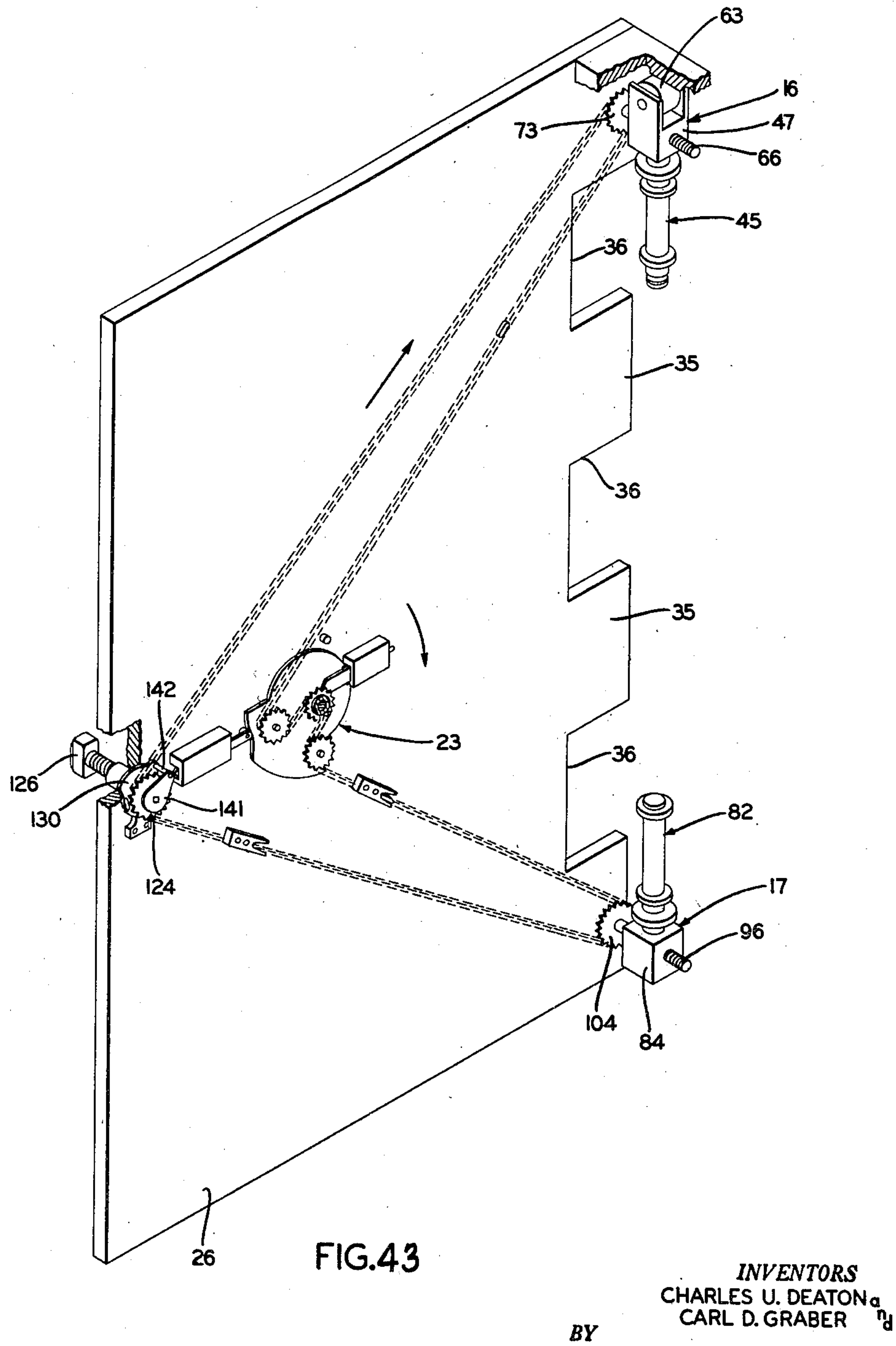
Fig. 43 is a fragmentary isometric view of certain parts of the improved door construction, some of the parts being shown schematically in dash lines, and showing the relative positions of the illustrated parts when the door is ready to be opened or is ready for seal-plugging in the door frame.

Fig. 43 is a fragmentary isometric view showing certain parts of the improved door construction, including parts of the separable door and framing mechanism, and parts of the hinge mechanisms, the illustrated parts being in their relative positions when the door is ready to be opened or is ready for seal-plugging in the door frame. Fig. 36 is a corresponding elevational view.

Figure 44:
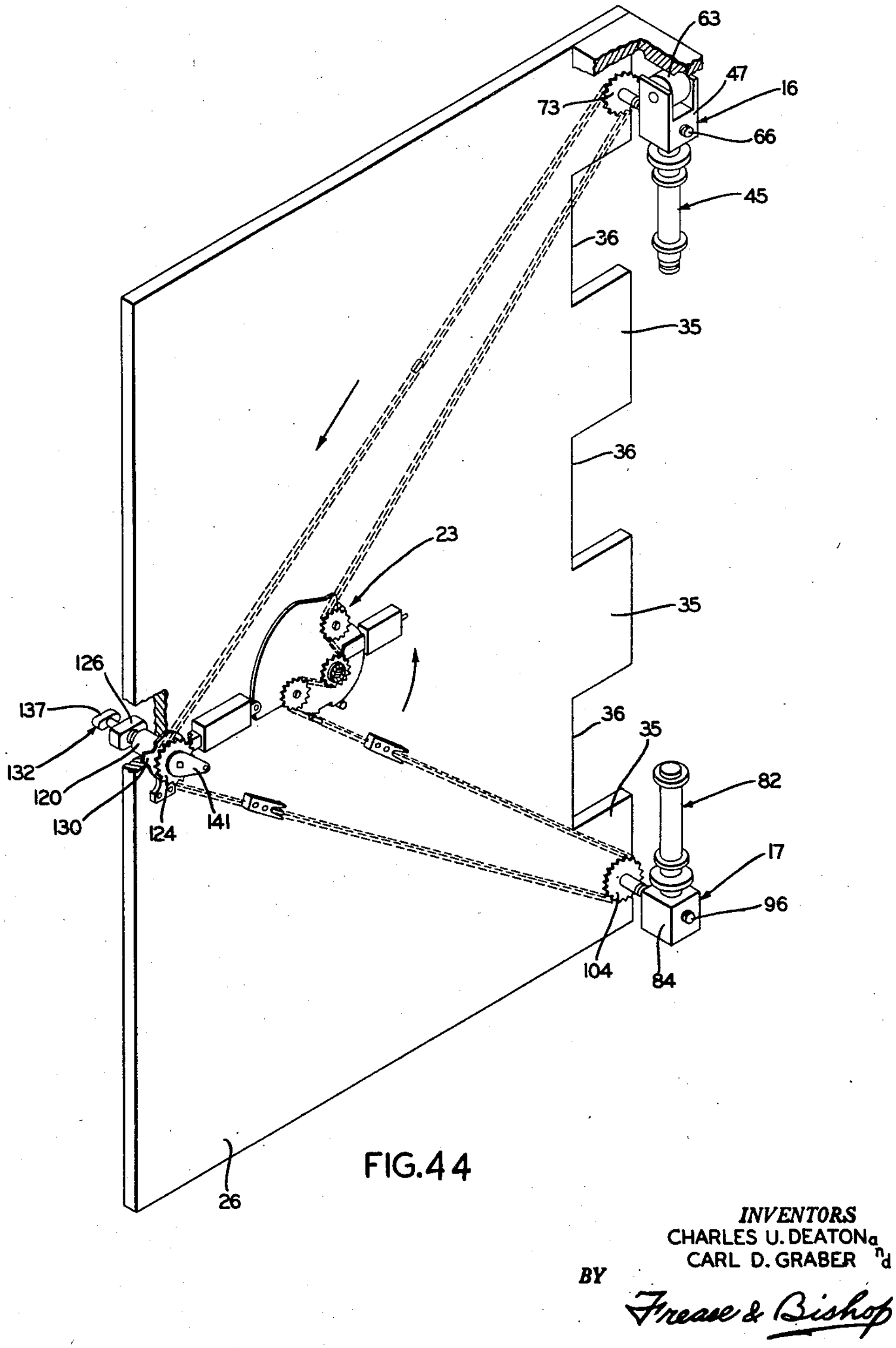
Fig. 44 is a view similar to Fig. 43, showing the relative positions of the illustrated parts, after the door has been seal-plugged in the door frame.

Fig. 44 is a view similar to Fig. 43, showing the relative positions of the illustrated parts, after the door has been seal-plugged in the door frame. Fig. 32 is a corresponding elevational view.

Fig. 45 is a fragmentary view similar to Figs. 43 and 44 showing the relative positions of the illustrated parts at an intermediate point between the positions shown in Fig. 43 and the positions shown in Fig. 44. Fig. 39 is a corresponding elevational view.

We claim:

1. Door and frame engaging and disengaging mechanism for a co-acting door frame and door construction for a vault and the like, the co-acting door frame and door construction being of the type including door frame members engirdling an opening, a door dimensioned for pressure fitting in the opening, the door frame members including opposite side members, one of the frame side members being a door supporting frame member and the other frame side member being a door engaging and disengaging frame member, the door having a hinge side and a swinging side, and hinge means operatively interposed between the hinge side of the door and the door supporting frame member; the door and frame engaging and disengaging mechanism including a first unit mounted on the swinging side of the door, and a second unit mounted on the door engaging and disengaging frame side member, the first and second units of the door and frame engaging and disengaging mechanism including engageable and disengageable parts, the first unit including means operative to engage and disengage the parts and to move the swinging side of the door towards and away from the frame when the parts are engaged; and in which the door unit constitutes an anchor and push unit, and the door includes a front plate having a swinging side border portion overhanging the door engaging and disengaging frame side member when the door is closed, and in which the anchor and push unit includes a sleeve nut journalled in the overhanging door front plate border portion, the overhanging door front plate border portion having a front face and a back face, the sleeve nut extending forwardly beyond the front face and having a torque applying member secured thereon, and the sleeve nut having formed therein internal threads, an externally threaded tubular bolt screwed in the sleeve nut, the sleeve nut having a back end adjacent the back face of the overhanging door front plate border portion, the tubular bolt extending rearwardly beyond the back end of the sleeve nut and the tubular bolt having a back end having a cupped T-head formed thereon and the T-head having a rearwardly opening cup formed therein, the tubular bolt having a bore having a key slot cross-section through a portion of its length, an operating and stop disk journalled on the front face of the door front plate border portion, the operating and stop disk being located forwardly of the front face and rearwardly of the torque applying member, a trigger plunger assembly operatively associated with the tubular bolt and the operating and stop disk and the door front plate, the trigger plunger assembly including a shaft extending through the bore of and beyond the opposite ends of the sleeve nut, the shaft having a key portion slidably fitting in the key slot portion of the tubular bolt and the shaft having a back end and a T-head on the back end of the shaft, the T-head being slidably into and out of the cup of the bolt T-head, the shaft having a front end beyond the torque applying member, an actuating lever secured on the front end of the shaft, the front face of the door front plate border portion having formed therein a socket, the operating and stop disk having formed therein a guide bore registerable with the socket, the actuating lever having a plunger extending rearwardly therefrom and slidably fitting in the guide bore of the actuating lever, and the plunger having a back end movable into and out of the socket in the front face of the door front plate border portion, whereby when the plunger back end is located in the socket the disk and the trigger plunger assembly are maintained against rotation, then rotation of the sleeve nut through the torque applying member serves to advance or retract the bolt slidably on the shaft into and out abutting engagement with the second unit and disengagement of the plunger from the socket, and whereby when the sleeve nut is maintained stationary then rotation of the disk serves to rotate the bolt and shaft to anchoring engagement with the second unit, and whereby maintaining the shaft and sleeve bolt against further rotation in the second unit permits clamping the swinging side of the door in the door frame.

2. Door and frame engaging and disengaging mechanism as set forth in claim 1, and in which the operating and stop disk has formed thereon a laterally exposed stop face, and a stop member is secured on the front face of the door front plate border portion the stop member being located in the path of movement of the disk stop face.

3. An anchor and push unit for an engaging and disengaging mechanism for overlapping members, the anchor and push unit including a sleeve nut journalled in one of the overlapping members, the one overlapping member having a front face and a back face, the sleeve nut extending forwardly beyond the front face and having a torque applying member secured thereon, and the sleeve nut having formed therein internal threads, an externally thread tubular bolt screwed in the sleeve nut, the sleeve nut having a back end adjacent the back face of the one overlapping member, the tubular bolt extending rearwardly beyond the back end of the sleeve nut and the tubular bolt having a back end having a cupped T-head formed thereon and the T-head having a rearwardly opening cup formed therein, the tubular bolt having a bore having a key slot cross section through a portion of its length, an operating and stop disk journalled on the front face of the one overlapping member, the operating and stop disk being located forwardly of the front face and rearwardly of the torque applying member, a trigger plunger assembly operatively associated with the tubular bolt and the operating and stop disk and the one overlapping member, the trigger plunger assembly including a shaft extending through the bore of and beyond the opposite ends of the sleeve nut, the shaft having a key portion slidably fitting in the key slot portion of the tubular bolt, and the shaft having a back end and a T-head on the back end of the shaft, the T-head being slidable into and out of the cup of the bolt T-head, the shaft having a front end beyond the torque applying member, an actuating lever secured on the front end of the shaft, the front face of the one overlapping member having formed therein a socket, the operating and stop disk having formed therein a guide bore registerable with the socket, the actuating lever having a plunger extending rearwardly therefrom and slidably fitting in the guide bore of the actuating lever, and the plunger having a back end movable into and out of the socket in the front face of the door front plate border portion, whereby when the plunger back end is located in the socket the disk and the trigger plunger assembly are maintained against rotation, then rotation of the sleeve nut through the torque applying member serves to advance or retract the bolt slidably on the shaft, and whereby when the sleeve nut is maintained stationary, then rotation of the disk serves to rotate the bolt and shaft, and whereby maintaining the shaft and sleeve bolt against further rotation permits movement of the sleeve nut on the bolt.

4. An anchor and push unit for an engaging and disengaging mechanism for overlapping members, as set forth in claim 3, and in which the operating and stop disk has formed thereon a laterally exposed stop face, and a stop member is secured on the front face of the one overlapping member, the stop member being located in the path of movement of the disk stop face.

5. Engaging and disengaging mechanism for overlapping members, the engaging and disengaging mechanism including a first unit mounted on one of the members, and a second unit mounted on the other member, the first and second units of the engaging and disengaging mechanism including engageable and disengageable parts, one of the units including means operative to engage and disengage the parts and to move the overlapping members towards and away from each other when the parts are engaged; and in which the one unit constitutes an anchor and push unit, the anchor and push unit including a sleeve nut journalled in one of the overlapping members, the one overlapping member having a front face and a back face, the sleeve nut extending forwardly beyond the front face and having a torque applying member secured thereon, and the sleeve nut having formed therein internal threads, an externally thread tubular bolt screwed in the sleeve nut, the sleeve nut having a back end adjacent the back face of the one overlapping member, the tubular bolt extending rearwardly beyond the back end of the sleeve nut and the tubular bolt having a back end having a cupped T-head formed thereon and the T-head having a rearwardly opening cup formed therein, the tubular bolt having a bore having a key slot cross section through a portion of its length, an operating and stop disk journalled on the front face of the one overlapping member, the operating and stop disk being located forwardly of the front face and rearwardly of the torque applying member, a trigger plunger assembly operatively associated with the tubular bolt and the operating and stop disk and the one overlapping member, the trigger plunger assembly including a shaft extending through the bore of and beyond the opposite ends of the sleeve nut, the shaft having a key portion slidably fitting in the key slot portion of the tubular bolt, and the shaft having a back end and a T-head on the back end of the shaft, the T-head being slidable into and out of the cup of the bolt T-head, the shaft having a front end beyond the torque applying member, an actuating lever secured on the front end of the shaft, the front face of the one overlapping member having formed therein a socket, the operating and stop disk having formed therein a guide bore registerable with the socket, the actuating lever having a plunger extending rearwardly therefrom and slidably fitting in the guide bore of the actuating lever, and the plunger having a back end movable into and out of the socket in the front face of the door front plate border portion, whereby when the plunger back end is located in the socket the disk and the trigger plunger assembly are maintained against rotation, then rotation of the sleeve nut through the torque applying member serves to advance or retract the bolt slidably on the shaft, and whereby when the sleeve nut is maintained stationary, then rotation of the disk serves to rotate the bolt and shaft, and whereby maintaining the shaft and sleeve bolt against further rotation permits movement of the sleeve nut on the bolt.

6. Engaging and disengaging mechanism for overlapping members, as set forth in claim 5, and in which the operating and stop disk has formed thereon a laterally exposed stop face, and a stop member is secured on the front face of the one overlapping member, the stop member being located in the path of movement of the disk stop face.

7. Engaging and disengaging mechanism for overlapping members, as set forth in claim 6, and in which spring means are operative between the trigger plunger assembly shaft and the tubular bolt, the spring means pressing the shaft rearwardly with respect to the bolt when the bolt is maintained against rotation and during a portion of its translatory movement in the sleeve nut.

References Cited in the file of this patent

UNITED STATES PATENTS

| | | |
|---|---|---|
| 1,127,116 | Thorne | Feb. 2, 1915 |
| 1,250,736 | Ward | Dec. 18, 1917 |
| 1,876,115 | Way | Sept. 6, 1932 |
| 2,095,271 | Swanstrom | Oct. 12, 1937 |
| 2,670,232 | Schmitz | Feb. 23, 1954 |

FOREIGN PATENTS

| | | |
|---|---|---|
| 290,410 | Great Britain | May 17, 1928 |